United States Patent
Chen et al.

(10) Patent No.: US 12,018,041 B2
(45) Date of Patent: Jun. 25, 2024

(54) METAL TIN CYCLIZED PERYLENE DIIMIDE DERIVATIVE, METHOD FOR PREPARING THE SAME, AND METHOD FOR USING THE SAME

(71) Applicant: Dalian University of Technology, Liaoning (CN)

(72) Inventors: Lingcheng Chen, Liaoning (CN); Wenzhong Zhang, Liaoning (CN); Yi Xiao, Liaoning (CN)

(73) Assignee: Dalian University of Technology, Dalian (CN)

( * ) Notice: Subject to any disclaimer, the term of this patent is extended or adjusted under 35 U.S.C. 154(b) by 824 days.

(21) Appl. No.: 17/138,884

(22) Filed: Dec. 30, 2020

(65) Prior Publication Data

US 2021/0198292 A1 Jul. 1, 2021

Related U.S. Application Data

(63) Continuation of application No. PCT/CN2020/099587, filed on Jun. 30, 2020.

(30) Foreign Application Priority Data

Dec. 30, 2019 (CN) .......................... 201911396285.4

(51) Int. Cl.
    *C07F 7/22* (2006.01)
(52) U.S. Cl.
    CPC .................................. *C07F 7/2208* (2013.01)
(58) Field of Classification Search
    CPC .............................. C07F 7/2208; C09K 11/06
    See application file for complete search history.

(56) References Cited

FOREIGN PATENT DOCUMENTS

| | | | | |
|---|---|---|---|---|
| CN | 108570067 A | * | 9/2018 | ............ C07F 7/0812 |
| WO | 2017022491 A1 | | 2/2017 | |

OTHER PUBLICATIONS

James E. Yarnell et al., Positional Effects from σ-Bonded Platinum(II) on Intersystem Crossing Rates in Perylenediimide Complexes: Synthesis, Structures, and Photophysical Properties, The Journal of Physical Chemistry C, 2018, pp. 13848-13862, vol. 122.
Zetong Ma et al., Palladium-Catalyzed Si—C Bond Formation toward Sila-Annulated Perylene Diimides, Organic Letters, 2017, pp. 4331-4334, vol. 19.
Ravindra Kumar Gupta et al., Columnar Self-Assembly of Electron-Deficient Dendronized Bay-Annulated Perylene Bisimides, Chemistry: A European Journal, 2018, pp. 3566-3575, vol. 24.

* cited by examiner

*Primary Examiner* — Alexander R Pagano
*Assistant Examiner* — Frank S. Hou

(57) ABSTRACT

A metal tin cyclized perylene diimide derivative, having a structure formula of:

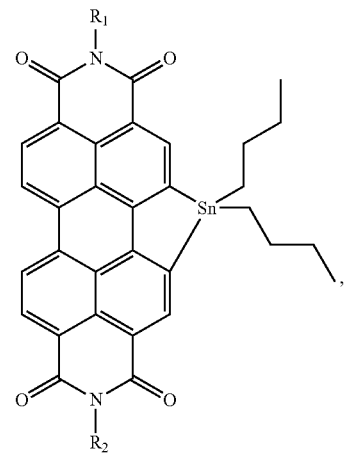

where $R_1$ and $R_2$ are each independently selected from a hydrogen atom or a group containing or not containing a substituent. The group containing or not containing a substituent is an alkyl having between 1 and 60 carbon atoms, an alkoxy having between 1 and 60 carbon atoms, a cycloalkyl having between 3 and 60 carbon atoms, an aryl having between 5 and 60 atoms, an alkylaryl having between 1 and 60 carbon atoms, an alkylheteroaryl having between 1 and 60 carbon atoms, an alkylheterocyclyl having between 1 and 60 carbon atoms, an alkyleneoxyalkyl having between 1 and 60 carbon atoms, an alkyleneoxyaryl having between 1 and 60 carbon atoms, an alkyleneoxyheteroaryl having between 1 and 60 carbon atoms, or an alkyleneoxyheterocyclyl having between 1 and 60 carbon atoms.

5 Claims, 5 Drawing Sheets

METAL TIN CYCLIZED PERYLENE DIIMIDE DERIVATIVE, METHOD FOR PREPARING THE SAME, AND METHOD FOR USING THE SAME

CROSS-REFERENCE TO RELATED APPLICATIONS

This application is a continuation of International Patent Application No. PCT/CN2020/099587 with an international filing date of Jun. 30, 2020, designating the United States, now pending, and further claims priority benefits to Chinese Patent Application No. 201911396285.4 filed Dec. 30, 2019. The contents of all of the aforementioned applications, including any intervening amendments thereto, are incorporated herein by reference.

BACKGROUND

Technical Field

The present application relates to the technical field of organic semiconductor materials, and more particularly to a metal tin cyclized perylene diimide derivative, a method for preparing the same, and a method for using the same.

Description of the Related Art

Perylene diimide is an abbreviation of 3,4,9,10-perylene tetracarboxylic diimide. Perylene diimide has a molecule composed of a central perylene ring skeleton and dicarboxylic imides at two sides, and is characterized in its strong absorption in the visible light region, high molar extinction coefficient and fluorescence quantum yield, good light stability and thermal stability, thus being considered as a class of organic semiconductor materials with excellent performance. A bay position of perylene diimide is affected by imide electron-withdrawing groups on two sides thereof, and thus has strong reactivity and is prone to aromatic electrophilic substitution reaction, so as to introduce active groups such as halogen or nitro into the bay position of perylene diimide and to perform more complex chemical modifications. In recent years, due to the effect of increasing the conjugation plane and regulating the electronic structure of molecules, the ring-forming reaction at the bay position has become a research hotspot by researchers. Among them, introduction of heteroatoms (including selenium atoms, nitrogen atoms, oxygen atoms, and silicon atoms) at the bay position of perylene diimide to form a ring for the purpose of regulating the physical and chemical properties of molecules has become a major research boom. However, the currently known atoms that are introduced to form the heterocycles are all non-metallic atoms, and do not involve any metal atoms. Therefore, how to develop perylene diimide derivatives that introduce metal atoms at the bay position to form a ring is a challenging work, and the optical properties of such metal cyclized perylene diimide compounds are worth exploring. So far, there is no perylene diimide derivative involved in metal tin cyclization of the bay position.

SUMMARY

In view of the above-described problems, it is an objective of the present application to provide a metal tin cyclized perylene diimide derivative, a method for preparing the same, and a method for using the same.

To achieve the above objectives, in accordance with one embodiment of the present application, there is provided a metal tin cyclized perylene diimide derivative, having a structure formula of:

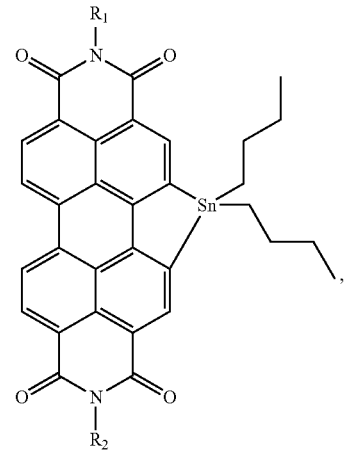

where $R_1$ and $R_2$ are each independently selected from a hydrogen atom or a group containing or not containing a substituent. The group containing or not containing a substituent is an alkyl having between 1 and 60 carbon atoms, an alkoxy having between 1 and 60 carbon atoms, a cycloalkyl having between 3 and 60 carbon atoms, an aryl having between 5 and 60 atoms, an alkylaryl having between 1 and 60 carbon atoms, an alkylheteroaryl having between 1 and 60 carbon atoms, an alkylheterocyclyl having between 1 and 60 carbon atoms, an alkyleneoxyalkyl having between 1 and 60 carbon atoms, an alkyleneoxyaryl having between 1 and 60 carbon atoms, an alkyleneoxyheteroaryl having between 1 and 60 carbon atoms, or an alkyleneoxyheterocyclyl having between 1 and 60 carbon atoms.

In a class of this embodiment, the group containing or not containing a substituent is methyl, ethyl, propyl, isopropyl, n-butyl, sec-butyl, isobutyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, methoxy, ethoxy, propoxy, isopropoxy, n-butoxy, sec-butoxy, isobutoxy, tert-butoxy, pentoxy, hexyloxy, heptoxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosyloxy, phenyl, naphthyl, anthryl, phenanthryl, tetraphenyl, pentaphenyl, hexaphenyl, pyrenyl, indenyl, biphenyl, fluorenyl, cyclobutyl, cyclopentyl, cyclohexyl, cycloheptyl, cyclooctyl, cyclononyl, cyclodecyl, undecylcycloalkyl, dodecylcycloalkyl, tridecylcycloalkyl, tetradecylcycloalkyl, pentadecylcycloalkyl, hexadecylcycloalkyl, heptadecylcycloalkyl, octadecylcycloalkyl, nonadecylcycloalkyl, eicosylcycloalkyl, thienyl, pyrrolyl, furyl, selenyl, thirolyl, telluryl, oxazolyl, pyridyl, or pyrimidinyl containing or not containing a substituent; or a group derived from the condensation of a ring of one of the above heteroaryls with a ring of one of the above aryls, or a combination of the above heteroaryls. These groups composing the heteroaryls may contain additional substituents.

In a class of this embodiment, the substituent is selected from the following groups: an alkyl, particularly an alkyl having between 1 and 16 carbon atoms; an alkoxy, particularly an alkoxy having between 1 and 16 carbon atoms; an aryl, particularly an aryl having between 5 and 16 carbon atoms; an cycloalkyl, particularly an cycloalkyl having between 3 and 16 carbon atoms; an heterocyclyl, particularly an heterocyclyl having between 5 and 16 carbon atoms, where the heterocyclyl containing heteroatoms selected from the group consisting of B, Si, O, Sn, N, S, P, and Se; a heteroaryl, particularly a heteroaryl having between 1 and 16 carbon atoms; a heteroaralkyl, particularly a heteroaralkyl composed of an aryl moiety having between 5 and 16 carbon atoms and an alkyl moiety having between 1 and 16 carbon atoms; a heteroaralkyloxy, particularly a heteroaralkyloxy composed of an aryl moiety having between 5 and 16 carbon atoms and an alkoxy moiety having between 1 and 16 carbon atoms; an alkenyl, particularly vinyl, allyl, 2-butenyl, 3-pentenyl, etc.; an alkynyl, particularly propargyl, 3-pentynyl, etc.; an amino substituent, particularly amino, methylamino, dimethylamino, etc.; an acyl, particularly formyl, acetyl, benzoyl, etc.; an alkylthio, particularly methylthio, ethylthio, etc.; an arylthio, particularly phenylthio, etc.; a heteroarylthio, particularly pyridylthio, etc.; a heterocyclic group, particularly imidazolyl, pyridyl, etc.; hydroxyl; a halogen atom; cyano; aldehyde; esteryl; sulfonate, sulfinate; nitro; amino; imino; carboxyl; and hydrazine. Most preferably, the substituent is at least one selected from the group consisting of methyl, ethyl, propyl, isopropyl, n-butyl, sec-butyl, isobutyl, tert-butyl, hydroxyl, mercapto, fluorine atom, chlorine atom, bromine atom, iodine atom, cyano, aldehyde, esteryl, sulfonate, sulfinate, nitro, amino, imino, carboxyl, and hydrazine.

In accordance with another embodiment of the present application, there is provided a method for preparing the metal tin cyclized perylene diimide derivative. The method comprises: mixing a compound A and hexa-n-butyl ditin, adding a catalyst and an organic solvent, stirring while heating a resulting mixture to carry out reaction, whereby yielding the metal tin cyclized perylene diimide derivative,

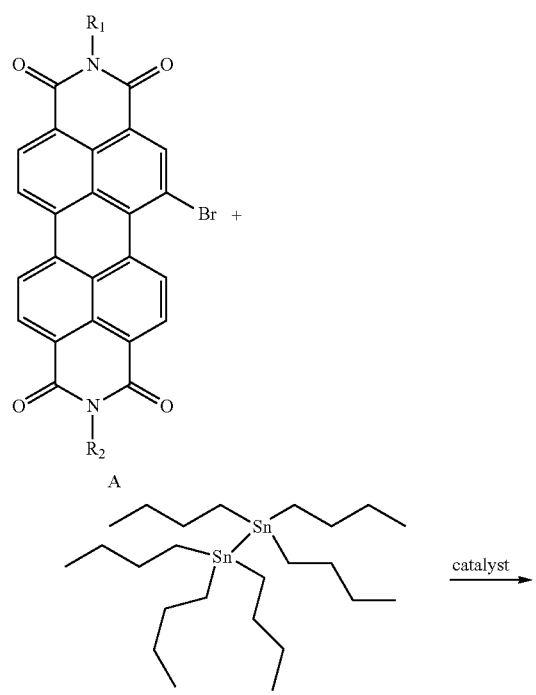

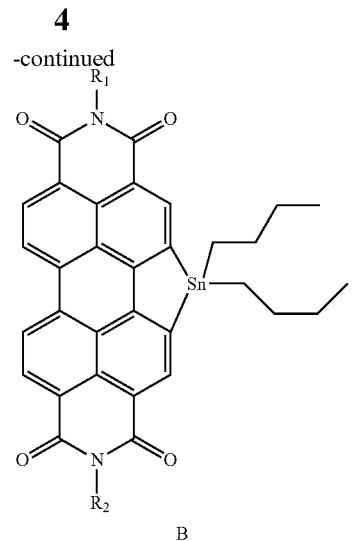

where $R_1$ and $R_2$ are the same as defined the structure formula of the metal tin cyclized perylene diimide derivative.

In a class of this embodiment, the heating temperature is between 90 and 180° C., a reaction time is between 1 and 30 hrs, and a dosage of hexa-n-butyl ditin is between 0.5 and 10 folds of a dosage of the compound A.

In a class of this embodiment, the organic solvent is one or more selected from the group consisting of benzene, toluene, xylene, chlorobenzene, dichlorobenzene, tetrahydrofuran, dioxane, nitrogen methyl pyrrolidone, dimethyl formamide, dimethyl acetamide, dimethyl sulfoxide, hexamethyl phosphoramide, sulfolane, acetonitrile, and benzonitrile.

In a class of this embodiment, the catalyst is palladium acetate or tris(dibenzylideneacetone)dipalladium.

In accordance with still another embodiment of the present application, there is provided a method for using the metal tin cyclized perylene diimide derivative. The method comprises: using the metal tin cyclized perylene diimide derivative as a photosensitizer applied to a field of photodynamic therapy; using the metal tin cyclized perylene diimide derivative as a catalyst applied to a field of catalytic oxidation related reactions; or using the metal tin cyclized perylene diimide derivative as a photoelectric material applied to fields of solar cells, light-emitting diodes, and organic field effect transistors.

Advantages of the metal tin cyclized perylene diimide derivative, the method for preparing the same, and the method for using the same according to embodiments of the present application are summarized as follows: a metal element is introduced to a bay position of perylene bisimide to form a five-membered ring, an ultraviolet-visible absorption spectrum of the derivative has a significant red shift, and the introduction of the metal tin element makes the derivative more valuable in technical fields of optoelectronic materials. When using as optoelectronic materials, the derivatives have great application prospects in the fields of solar cells, organic light-emitting diodes and organic field effect transistors. In addition, the introduction of heavy element tin makes the derivative possess a strong ability to generate triplet states and can be used as a new type of photosensitizer. Compared with traditional transition metal-modified perylene diimide photosensitizers, this new type of photosensitizer has a simple structure, can form a ring at the bay position, and has a simple synthesis method with less synthesis steps. The directly connected heavy metal tin enhances the property of perylene diimide in generating the triplet, as well as making the perylene diimide have longer triplet life, therefore, the derivative provides a technical solution of using the new metal element modified perylene diimide as a photosensitizer. In addition, the derivative has low cytotoxicity and can easily penetrate into cells, thus can be applied in the field of photodynamic therapy. The derivative can also be used as a catalyst in fields such as catalytic oxidation related reactions.

BRIEF DESCRIPTION OF THE DRAWINGS

The present application is described hereinbelow with reference to the accompanying drawings, in which.

DETAILED DESCRIPTION OF THE EMBODIMENTS

Figure 1:
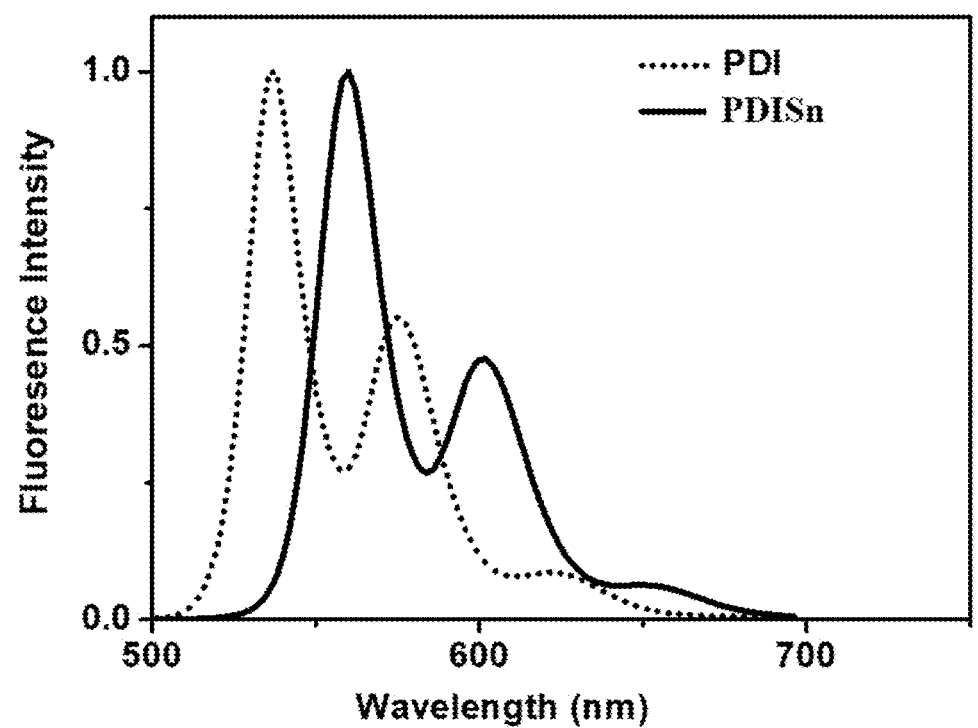
FIG. 1 is an absorption spectrum of 6-undecylamine derived tin-cyclized perylene diimide in a solution state.

In order to make the technical solutions of the present application clearer, the technical solutions in the examples will be described clearly and completely in conjunction with the examples of the present application. The following examples are intended to describe and not to limit the present application.

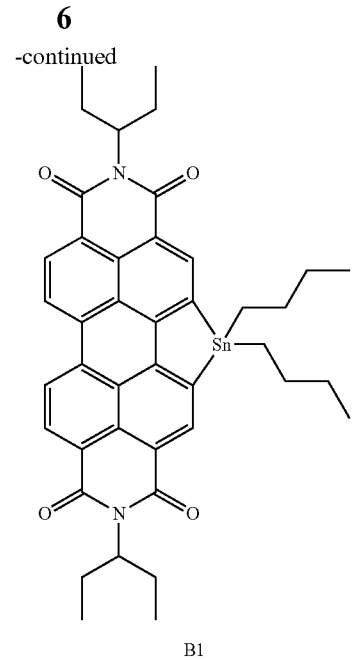

B1

1 g of bromo perylene diimide, 1.9 g of hexa-n-butyl ditin, 15 mg of dibenzylidene acetone palladium dichloride, and 20 mg of trismethylphenylphosphine were collected and placed into a reaction flask. 5 mL of toluene were added, and a resulting mixture was stirred at 90° ° C. for 6 hrs. When the reaction was completed, the reaction solution was spin-dried under a reduced pressure, and 0.6 g of a product was obtained by column chromatography. The yield was 48%. HRMS: found 762.2470.

Example 2

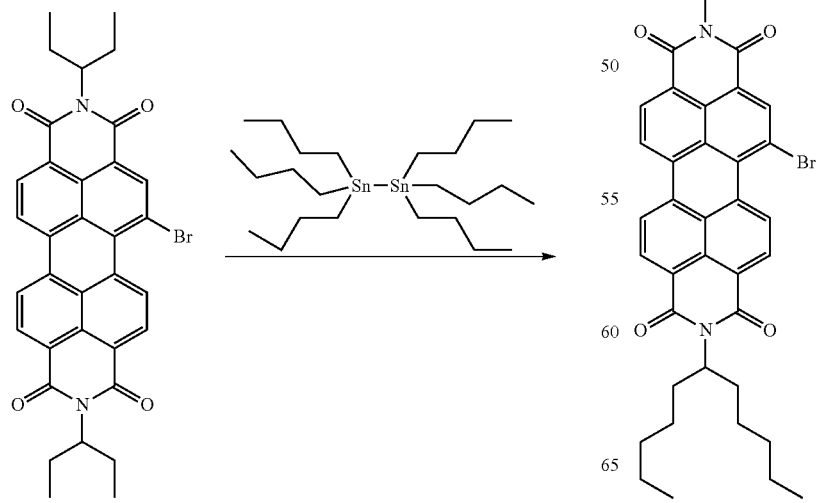

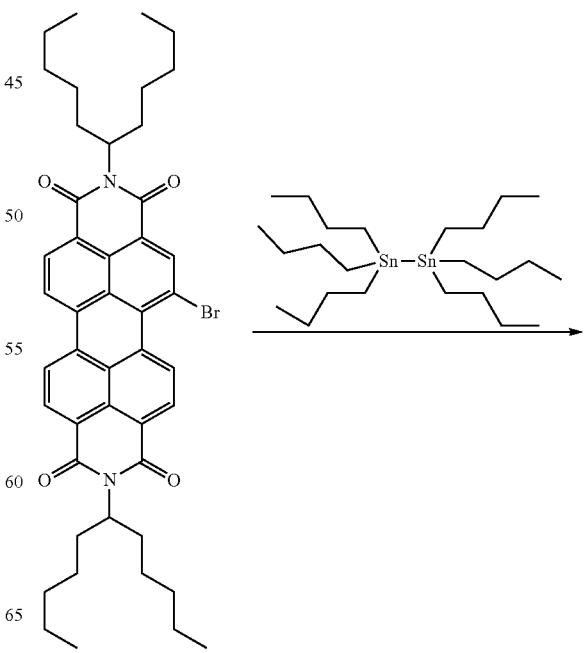

7
-continued

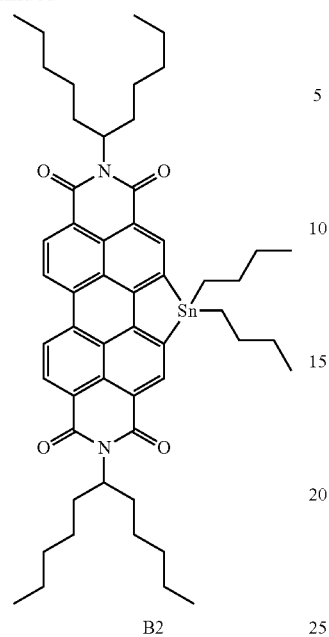

B2

8
-continued

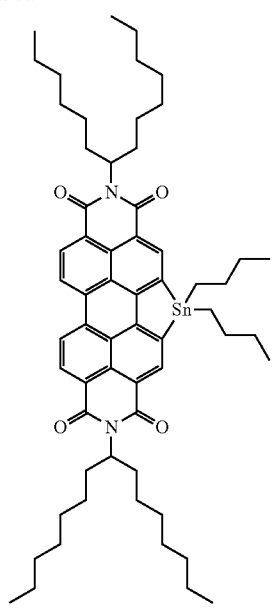

B3

1 g of bromo perylene diimide, 3.36 g of hexa-n-butyl ditin, 12 mg of dibenzylidene acetone palladium dichloride, and 16 mg of trismethylphenylphosphine were collected and placed into a reaction flask, 5 mL of toluene was added, and a resulting mixture was then stirred and refluxed at 110°C for 3 hrs. After the reaction was completed, a reaction solution was spin-dried under a reduced pressure, and 0.5 g of a product was yield by column chromatography. The yield was 41%. HRMS (MALDI-TOF): Calculated for C54H70N2O4Sn M—, 930.4358, found 930.4310.

1 g of bromo perylene diimide, 3.92 g of hexa-n-butyl ditin, and 5 mg of palladium acetate were collected and placed into a reaction flask, 5 mL of 1,4-dioxane was added, and a resulting mixture was stirred and refluxed at 120° ° C. for 3 hrs. When the reaction was complete, the reaction solution was spin-dried under a reduced pressure, and 0.48 g of a product was obtained by column chromatography. The yield was 40%. HRMS (MALDI-TOF): found 3462.1625

Example 3

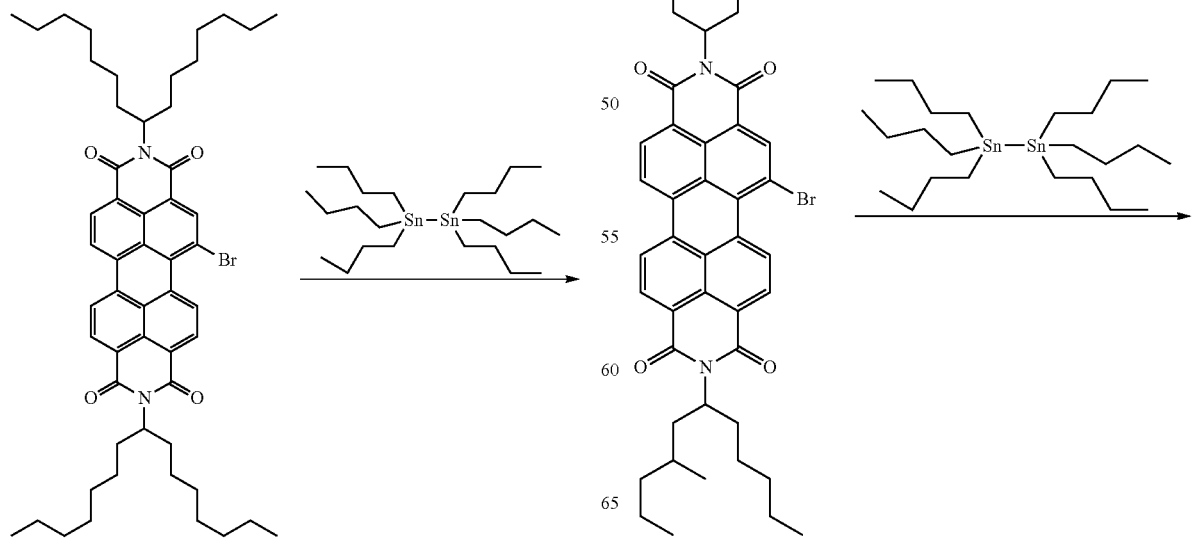

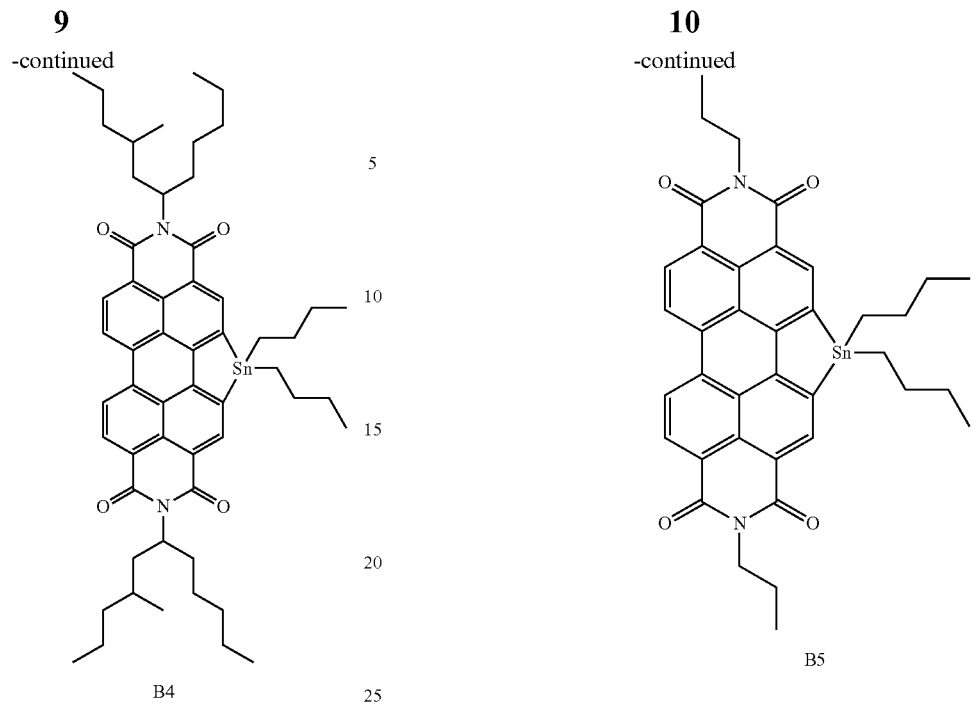

B4

The synthesis process may refer to Example 3.

Example 5

B5

1 g of bromo perylene diimide, 0.76 g of hexa-n-butyl ditin, and 8 mg of palladium acetate were collected and placed into a reaction flask, 5 mL of DMF was added, and a resulting mixture was stirred at 150° ° C. for 3 hrs. When the reaction was completed, the reaction solution was spin-dried under a reduced pressure, and 0.62 g of a product was obtained by column chromatography. The yield was 50%.
HRMS (MALDI-TOF): found 706.1746.

Example 6

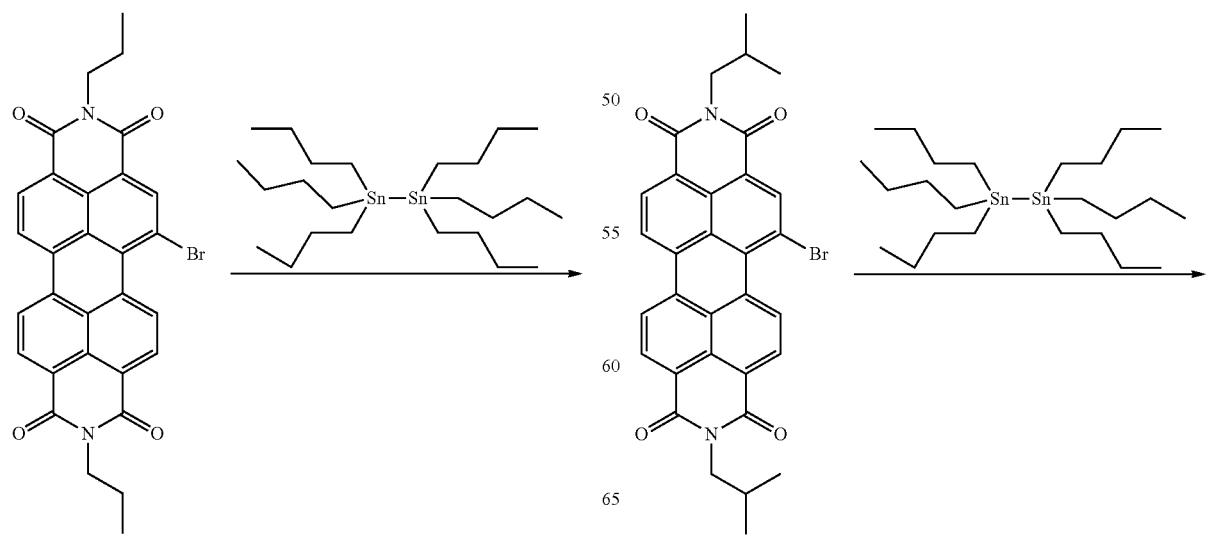

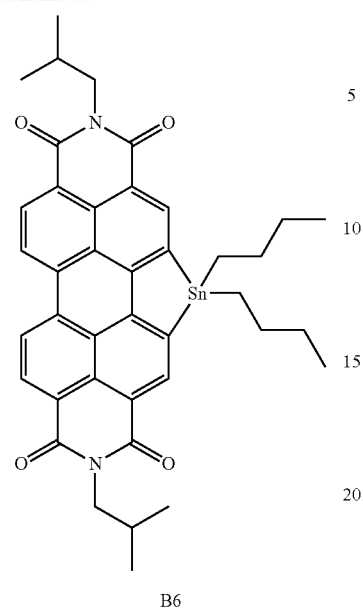

B6

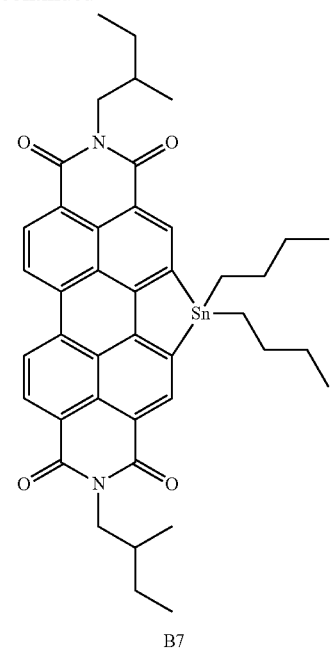

B7

1 g of bromo perylene diimide, 1.8 g of hexa-n-butyl ditin, and 8 mg of palladium acetate were collected and placed into a reaction flask, 2 mL of chlorobenzene and 2 mL of toluene were added, and a resulting mixture was stirred and refluxed at 120° C. for 3 hrs. When the reaction was completed, the reaction solution was spin-dried under a reduced pressure, and 0.6 g of a product was obtained by column chromatography. The yield was 47%. HRMS (MALDI-TOF): found 734.2022.

1 g of bromo perylene diimide, 5.7 g of hexa-n-butyl ditin, and 20 mg of palladium acetate were collected and placed into a reaction flask, 5 mL of nitromethylpyrrolidone was added, and a resulting mixture was stirred and refluxed at 180° ° C. for 1 hr. When the reaction was completed, the reaction solution was spin-dried under a reduced pressure, and 0.51 g of a product was obtained by column chromatography. The yield was 40%. HRMS (MALDI-TOF): found 762.2362.

Example 7

Example 8

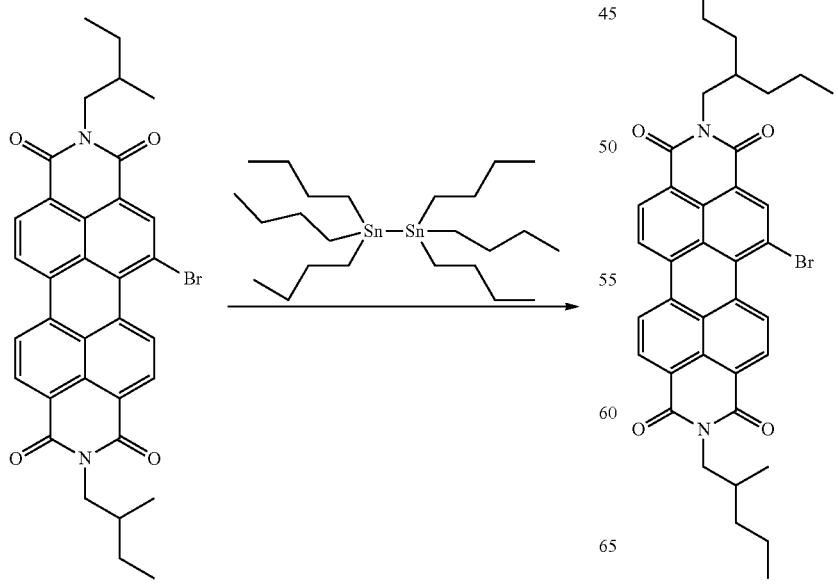

-continued

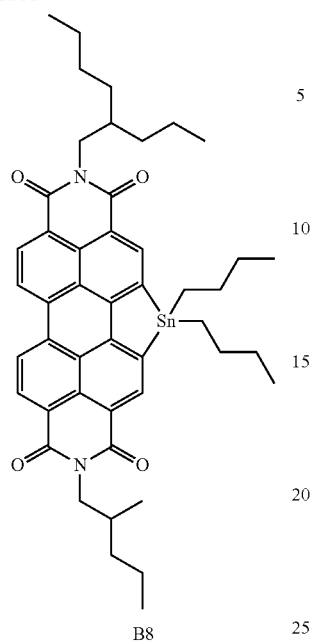

B8

1 g of bromo perylene diimide, 0.42 g of hexa-n-butyl ditin, and 17 mg of palladium acetate were collected and placed into a reaction flask, 5 mL of dichlorobenzene was added, and a resulting mixture was stirred and refluxed at 170° C. for 1 hour. When the reaction was completed, the reaction solution was spin-dried under a reduced pressure, and 0.4 g of a product was obtained by column chromatography. The yield was 33%. HRMS (MALDI-TOF): found 832.3262.

Example 9

-continued

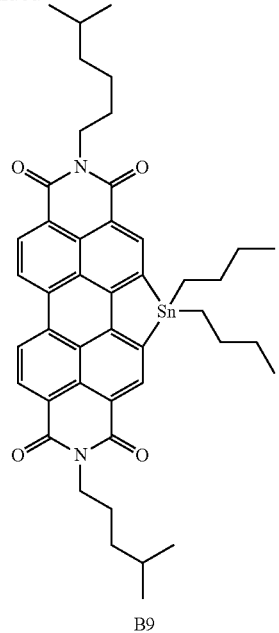

B9

1 g of bromo perylene diimide, 0.9 g of hexa-n-butyl ditin, and 36 mg of palladium acetate were collected and placed into a reaction flask, 5 mL of o-xylene was added, and a resulting mixture was stirred and refluxed at 70° C. for 6 hrs. When the reaction was completed, the reaction solution was spin-dried under a reduced pressure, and 0.43 g of a product was obtained by column chromatography. The yield was 35%. HRMS (MALDI-TOF): found 804.2949.

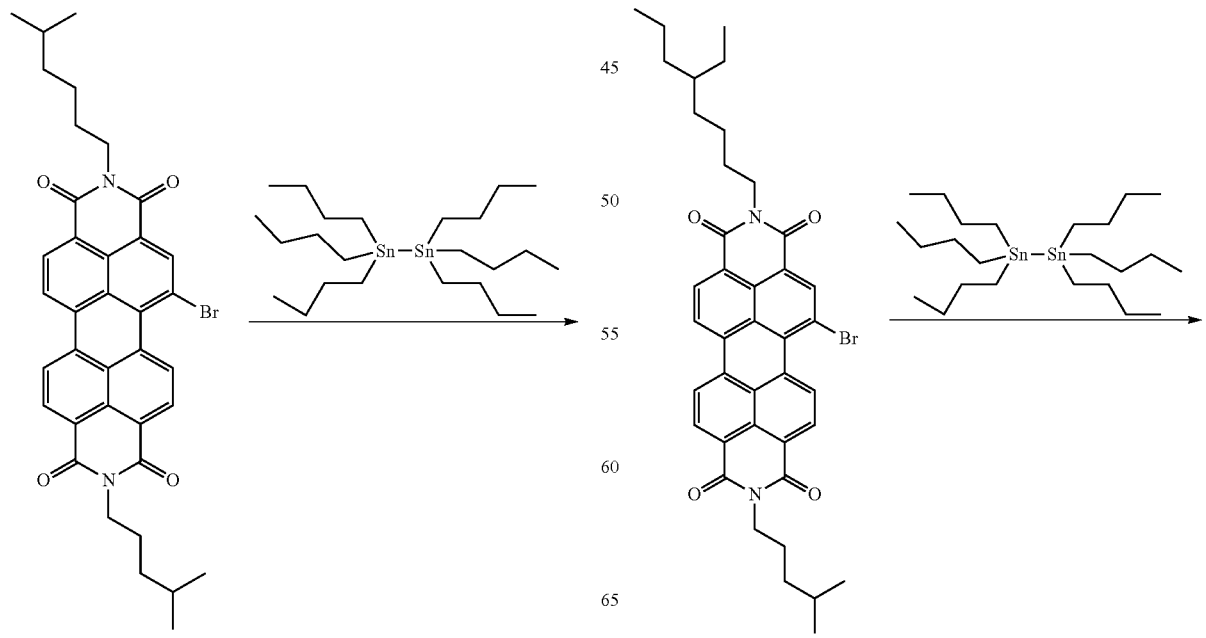

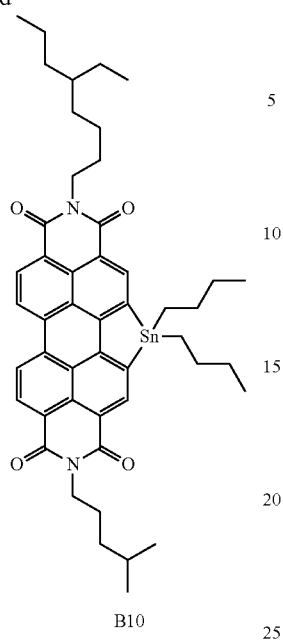

B10

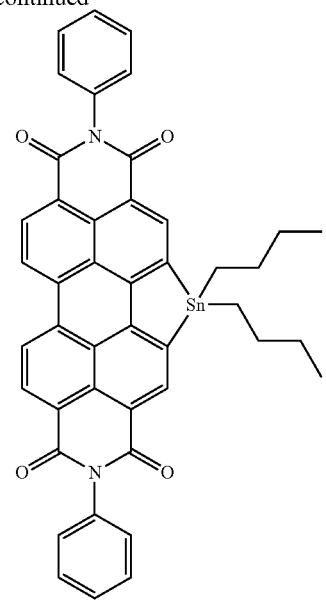

B11

1 g of bromo perylene diimide, 0.84 g of hexa-n-butyl ditin, and 33 mg of palladium acetate were collected and placed into a reaction flask, 5 mL of DMF was added, and a resulting mixture was stirred and refluxed at 70° C. for 6 hrs. When the reaction was completed, the reaction solution was spin-dried under a reduced pressure, and 0.55 g of a product was obtained by column chromatography. The yield was 45%. HRMS (MALDI-TOF): found 846.3419.

Example 11

1 g of bromo perylene diimide, 0.93 g of hexa-n-butyl ditin, 12 mg of dibenzylidene acetone palladium dichloride, and 15 mg of trismethylphenylphosphine were collected and placed into a reaction flask, 5 mL of dioxane was added, and a resulting mixture was stirred and refluxed at 110° C. for 3 hrs. When the reaction was completed, the reaction solution was spin-dried under a reduced pressure, and 0.34 g of a product was obtained by column chromatography. The yield was 27%. HRMS (MALDI-TOF): found 774.1541.

Example 12

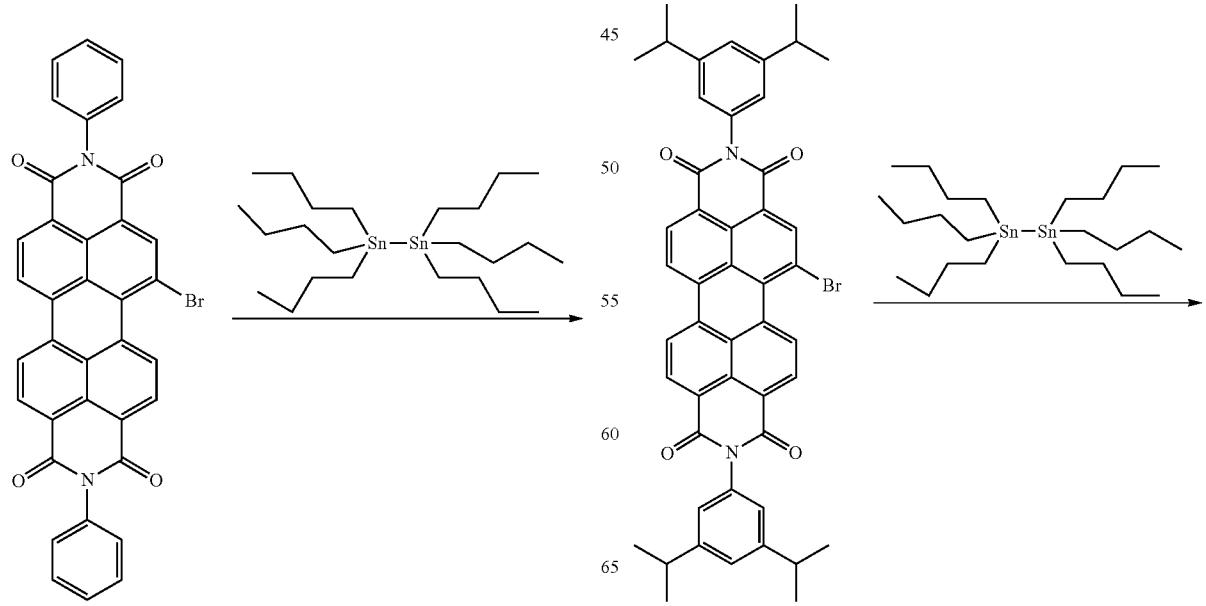

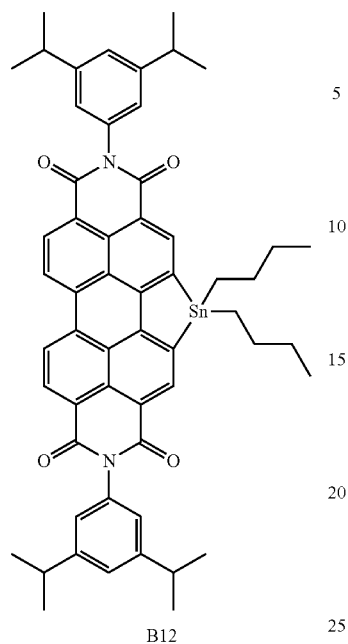

B12

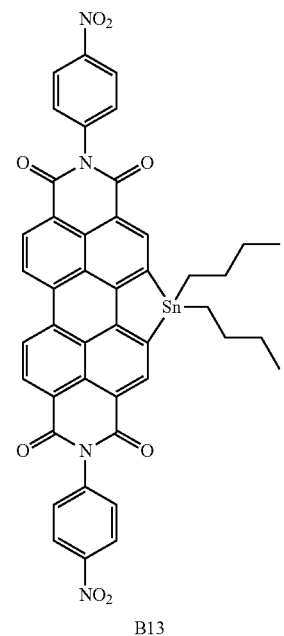

B13

1 g of bromo perylene diimide, 0.75 g of hexa-n-butyl ditin, 12 mg of dibenzylidene acetone palladium dichloride, and 15 mg of trismethylphenylphosphine were collected and placed into a reaction flask, 5 mL of acetonitrile was added, and a resulting mixture was stirred and refluxed at 90° C. for 10 hrs. When the reaction was completed, the reaction solution was spin-dried under a reduced pressure, and 0.45 g of a product was obtained by column chromatography. The yield was 38%. HRMS (MALDI-TOF): found 942.3419.

1 g of bromo perylene diimide, 0.78 g of hexa-n-butyl ditin, 12 mg of dibenzylidene acetone palladium dichloride, and 15 mg of trismethylphenylphosphine were collected and placed into a reaction flask, 5 mL of o-xylene was added, and a resulting mixture was stirred and refluxed at 90° C. for 30 hrs. After the reaction was completed, the reaction solution was spin-dried under a reduced pressure, and 0.45 g of a product was obtained by column chromatography. The yield was 37%. HRMS (MALDI-TOF): found 896.1140.

Example 14

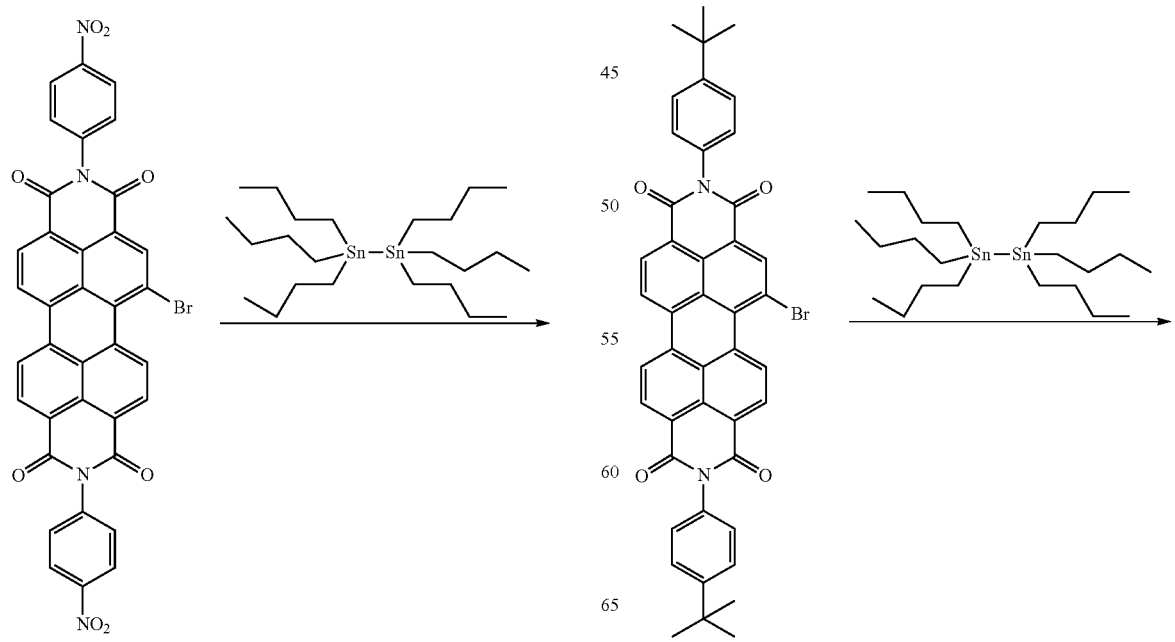

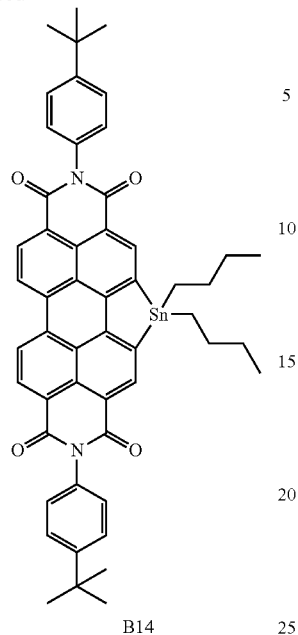

B14

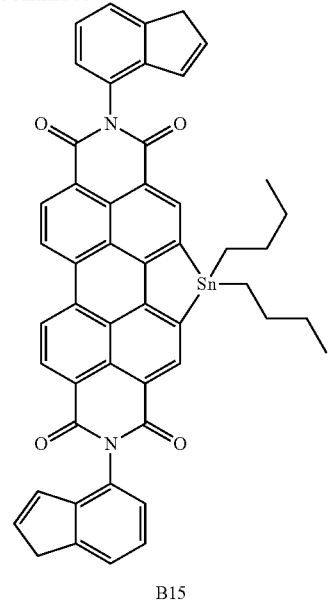

B15

1 g of bromo perylene diimide, 0.79 g of hexa-n-butyl ditin, 13 mg of dibenzylidene acetone palladium dichloride, and 17 mg of trismethylphenylphosphine were collected and placed into a reaction flask, 5 mL of toluene was added, and a resulting mixture was stirred and refluxed at 90° C. for 24 hrs. When the reaction was completed, the reaction solution was spin-dried under a reduced pressure, and 0.52 g of a product was obtained by column chromatography. The yield was 43%. HRMS (MALDI-TOF): found 886.2793.

Example 15

1 g of bromo perylene diimide, 0.83 g of hexa-n-butyl ditin, and 33 mg of palladium acetate were collected and placed into a reaction flask, 2 mL of sulfolane and 2 mL of hexamethylphosphoramide were added, and a resulting mixture was stirred and refluxed at 160° C. for 9 hrs. When the reaction was completed, the reaction solution was spin-dried under a reduced pressure, and 0.46 g of a product was obtained by column chromatography. The yield was 38%. HRMS (MALDI-TOF): found 850.1854.

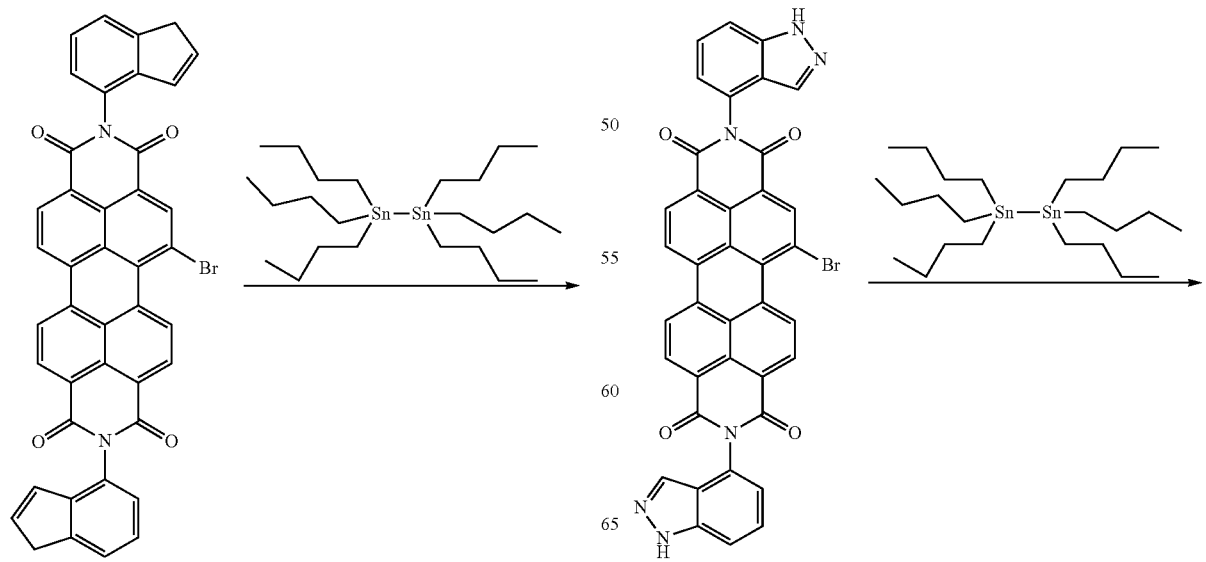

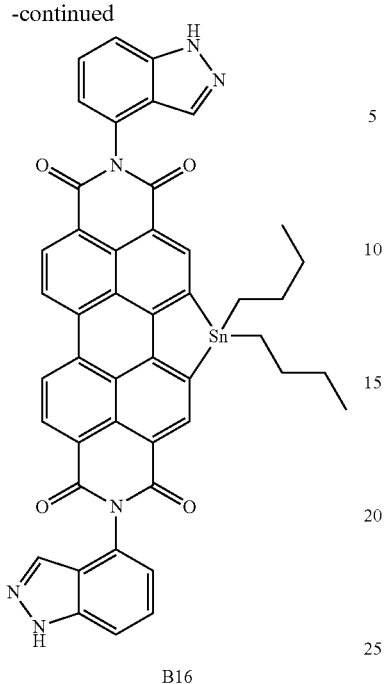

B16

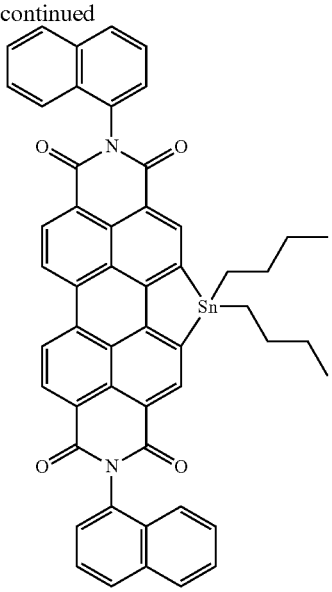

B17

1 g of bromo perylene diimide, 0.83 g of hexa-n-butyl ditin, and 6 mg of palladium acetate were collected and placed into a reaction flask, 5 mL of toluene was added, and a resulting mixture was stirred and refluxed at 110° C. for 3 hrs. When the reaction was completed, the reaction solution was spin-dried under a reduced pressure, and 0.38 g of a product was obtained by column chromatography. The yield was 31%. HRMS (MALDI-TOF): found 854.1664.

1 g of bromo perylene diimide, 0.8 g of hexa-n-butyl ditin, and 6 mg of palladium acetate were collected and placed into a reaction flask, 5 mL of 1,4-dioxane was added, and a resulting mixture was stirred and refluxed at 110° C. for 3 hrs. When the reaction was completed, the reaction solution was spin-dried under a reduced pressure, and 0.3 g of a product was obtained by column chromatography. The yield was 25%. HRMS (MALDI-TOF): found 874.1854.

Example 17

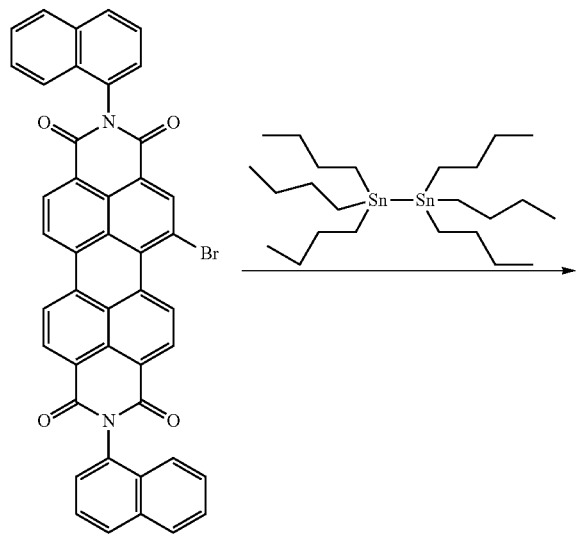

Example 18

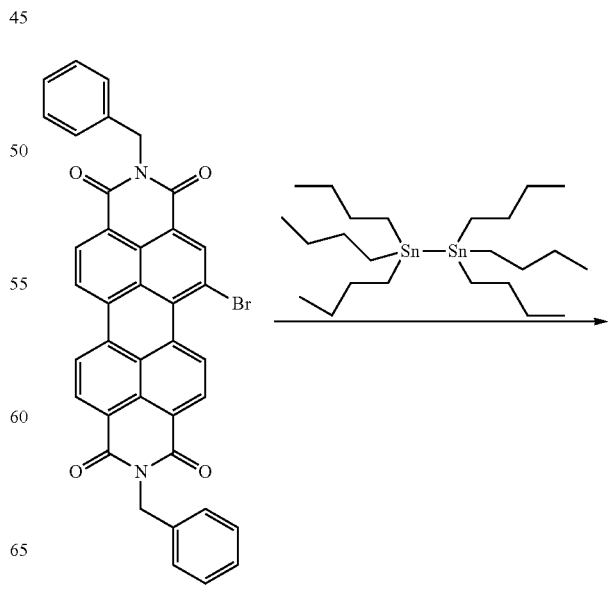

-continued

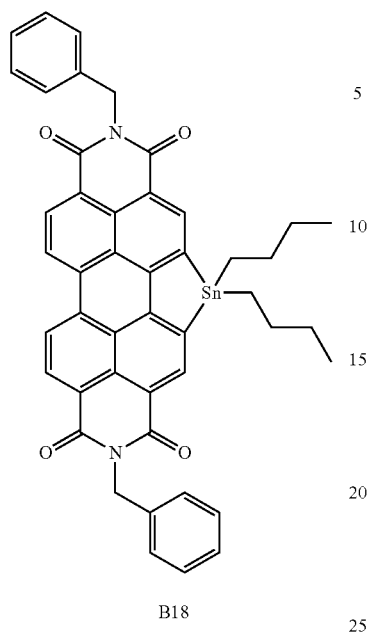

B18

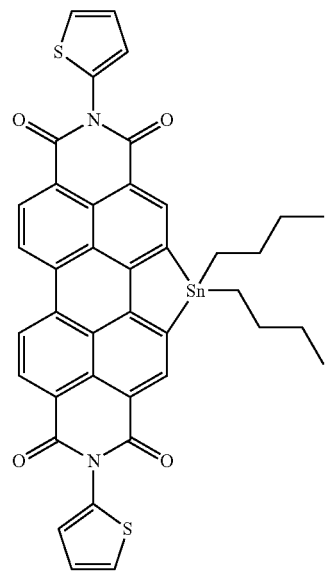

B19

1 g of bromo perylene diimide, 0.9 g of hexa-n-butyl ditin, 7 mg of palladium acetate were collected and placed into a reaction flask, 2 mL of 1,4-dioxane and 2 mL of dimethyl sulfoxide were added, and a resulting mixture was stirred and refluxed at 150° C. for 5 hrs. When the reaction was completed, the reaction solution was spin-dried under a reduced pressure, and 0.42 g of a product was obtained by column chromatography. The yield was 34%. HRMS (MALDI-TOF): found 802.1854.

1 g of bromo perylene diimide, 0.92 g of hexa-n-butyl ditin, and 9 mg of palladium acetate were collected and placed into a reaction flask, 2 mL of acetonitrile and 2 mL of benzonitrile were added, and a resulting mixture was stirred and refluxed at 100° C. for 20 hrs. When the reaction was completed, the reaction solution was spin-dried under a reduced pressure, and 0.5 g of a product was obtained by column chromatography. The yield was 40%. HRMS (MALDI-TOF): found 786.0669.

Example 20

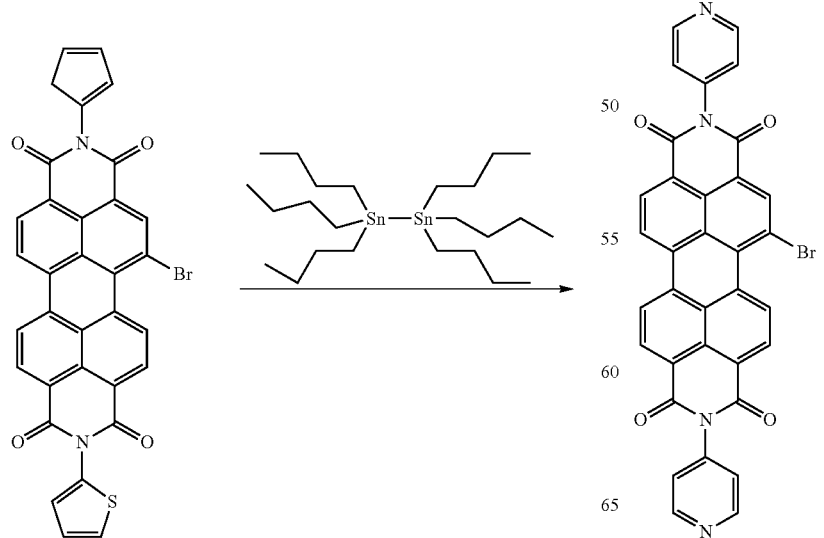

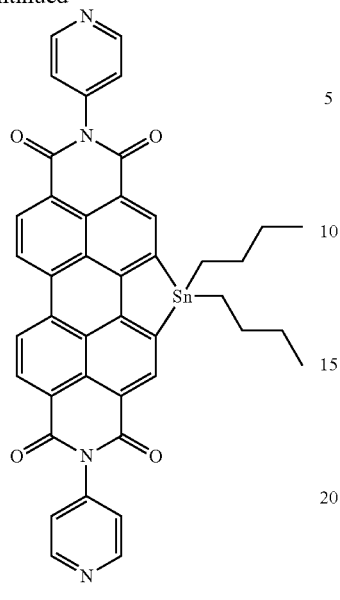

B20

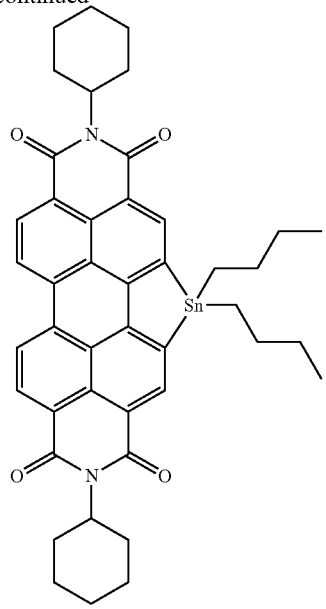

B21

1 g of bromo perylene diimide, 0.93 g of hexa-n-butyl ditin, and 7 mg of palladium acetate were collected and placed into a reaction flask, 2 mL of toluene and 1 mL of tetrahydrofuran were added, and a resulting mixture was stirred and refluxed at 130° C. for 8 hrs. When the reaction was completed, the reaction solution was spin-dried under a reduced pressure, and 0.5 g of a product was obtained by column chromatography. The yield was 40%. HRMS (MALDI-TOF): found 776.1446.

Example 21

1 g of bromo perylene diimide, 0.93 g of hexa-n-butyl ditin, and 8 mg of palladium acetate were collected and placed into a reaction flask, 5 mL of toluene was added, and a resulting mixture was stirred and refluxed at 110° C. for 3 hrs. When the reaction was completed, the reaction solution was spin-dried under a reduced pressure, and 0.48 g of a product was obtained by column chromatography. The yield was 38.1%. HRMS (MALDI-TOF): found 786.2486.

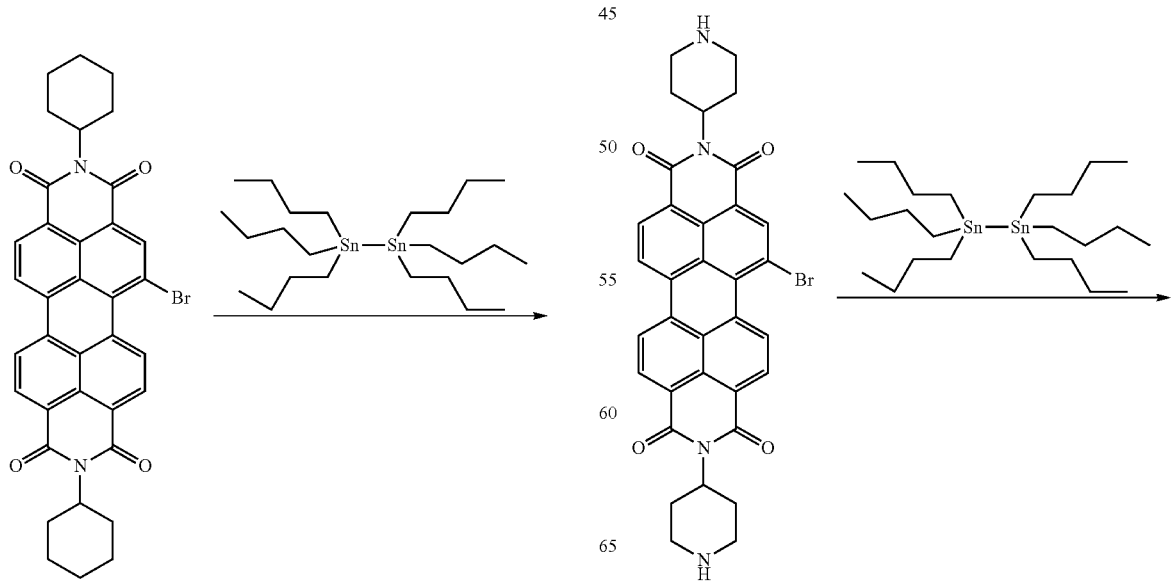

-continued

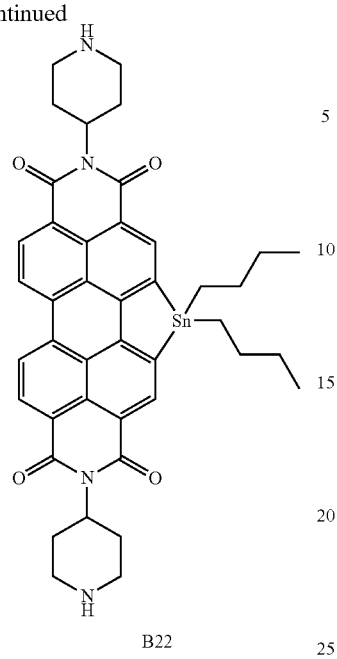

B22

-continued

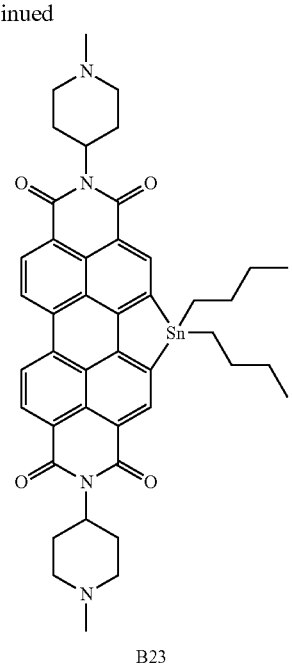

B23

1 g of bromo perylene diimide, 0.95 g of hexa-n-butyl ditin, and 7 mg of palladium acetate were collected and placed into a reaction flask, 3 mL of xylene and 1 mL of dichlorobenzene were added, and a resulting mixture was stirred and refluxed at 170° C. for 5 hrs. When the reaction was completed, the reaction solution was spin-dried under a reduced pressure, and 0.32 g of a product was obtained by column chromatography. The yield was 25.81%. HRMS (MALDI-TOF): found 786.228.

Example 23

1 g of bromo perylene diimide, 0.87 g of hexa-n-butyl ditin, and 7 mg of palladium acetate were collected and placed into a reaction flask, 5 mL of dioxane was added, and a resulting mixture was stirred and refluxed at 110° C. for 3 hrs. When the reaction was completed, the reaction solution was spin-dried under a reduced pressure, and 0.43 g of a product was obtained by column chromatography. The yield was 35%. HRMS (MALDI-TOF): found 816.2698.

Example 24

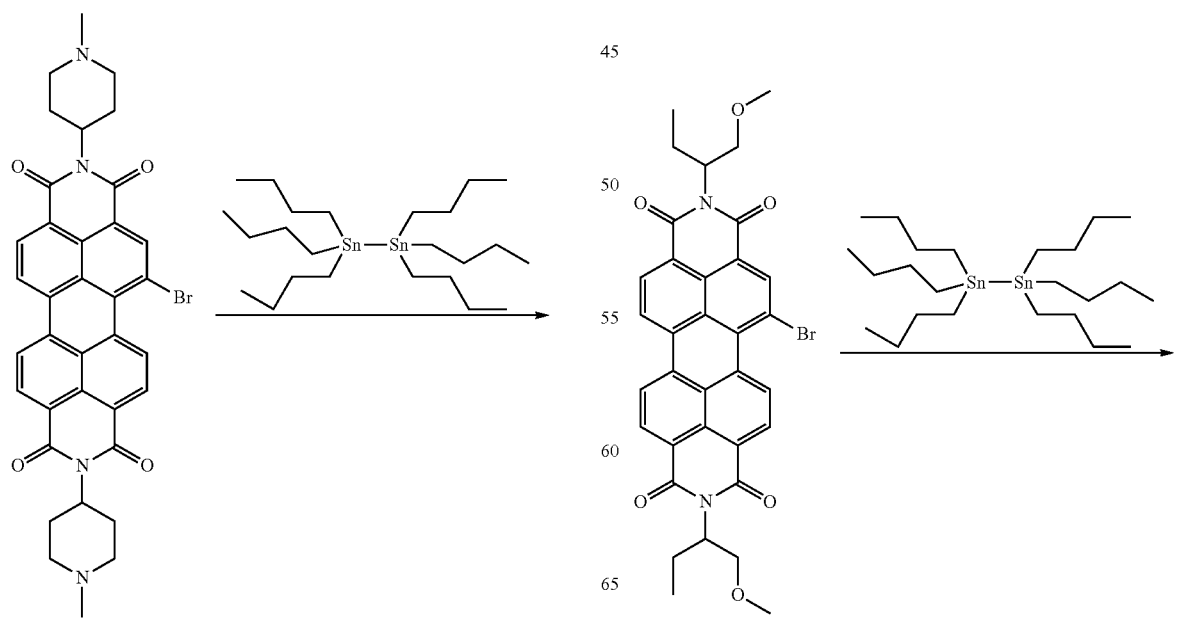

-continued

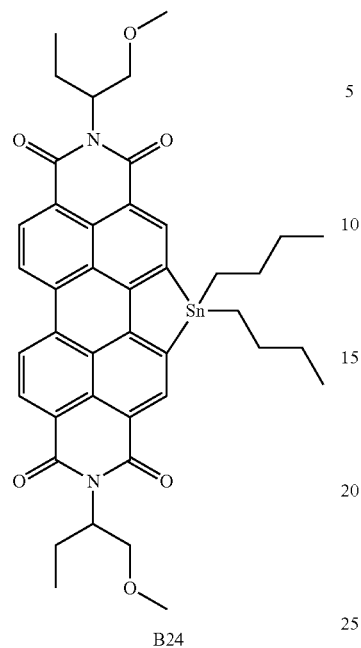

B24

1 g of bromo perylene diimide, 0.9 g of hexa-n-butyl ditin, and 7 mg of palladium acetate were collected and placed into a reaction flask, 3 mL of toluene and 1 mL of DMSO were added, and a resulting mixture was stirred and refluxed at 150° C. for 4 hrs. After the reaction was completed, the reaction solution was spin-dried under a reduced pressure, and 0.35 g of a product was obtained by column chromatography. The yield was 28%. HRMS (MALDI-TOF): found 794.2378.

Example 25

-continued

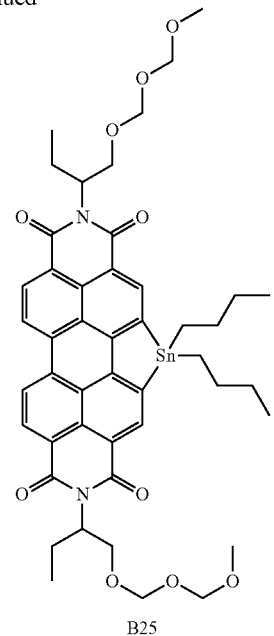

B25

1 g of bromo perylene diimide, 0.78 g of hexa-n-butyl ditin, and 6 mg of palladium acetate were collected and placed into a reaction flask, 2 mL of toluene and 1 mL of benzene were added, and a resulting mixture was stirred and refluxed at 120° C. for 3 hrs. When the reaction was completed, the reaction solution was spin-dried under a reduced pressure, and 0.37 g of a product was obtained by column chromatography. The yield was 31%. HRMS (MALDI-TOF): found 900.2644.

Example 26

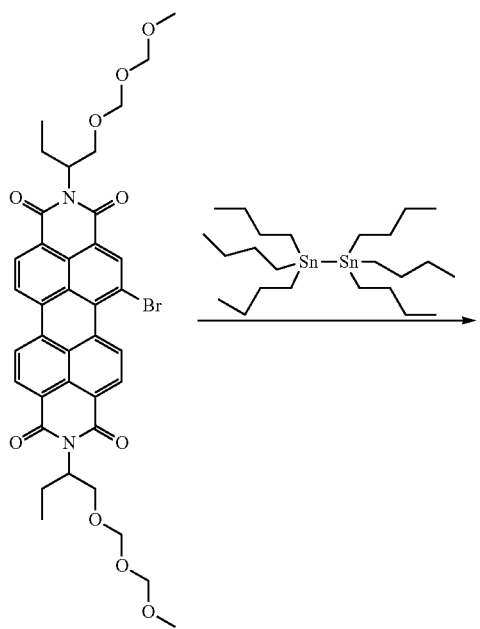

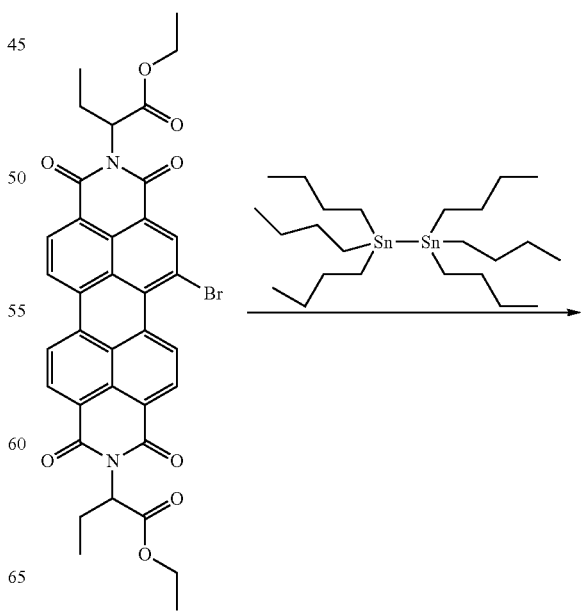

31
-continued

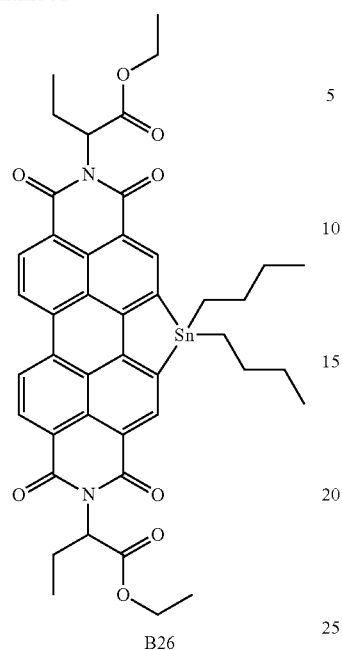

B26

1 g of bromo perylene diimide, 0.83 g of hexa-n-butyl ditin, 4 mg of palladium acetate were collected and placed into a reaction flask, 5 mL of DMF was added, and a resulting mixture was stirred and refluxed at 110° C. for 3 hrs. When the reaction was completed, the reaction solution was spin-dried under a reduced pressure, and 0.53 g of a product was obtained by column chromatography. The yield was 43.5%. HRMS (MALDI-TOF): found 850.2276.

Example 27

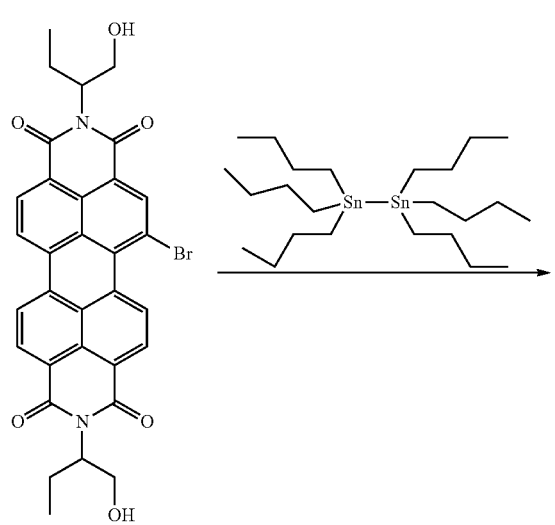

32
-continued

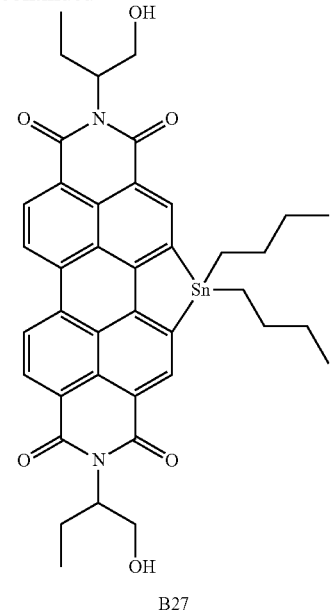

B27

1 g of bromo perylene diimide, 5.72 g of hexa-n-butyl ditin, and 8 mg of palladium acetate were collected and placed into a reaction flask, 5 mL of toluene was added, and a resulting mixture was stirred and refluxed at 110° C. for 3 hrs. After the reaction was completed, the reaction solution was spin-dried under a reduced pressure, and 0.42 g of a product was obtained by column chromatography. The yield was 33.6%. HRMS (MALDI-TOF): found 751.1863.

Example 28

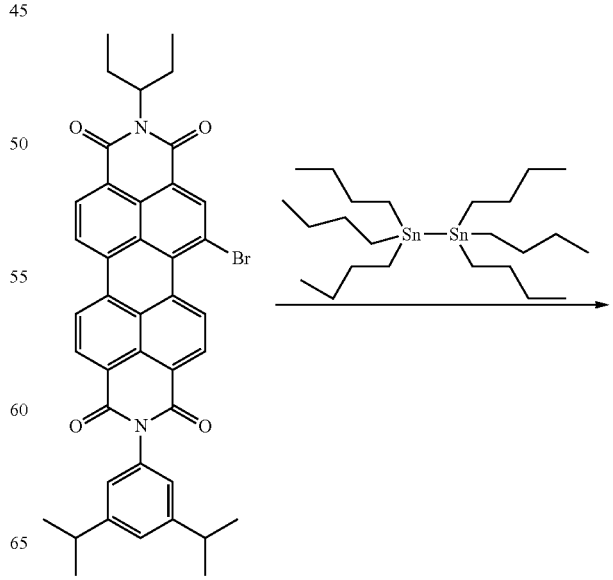

33
-continued

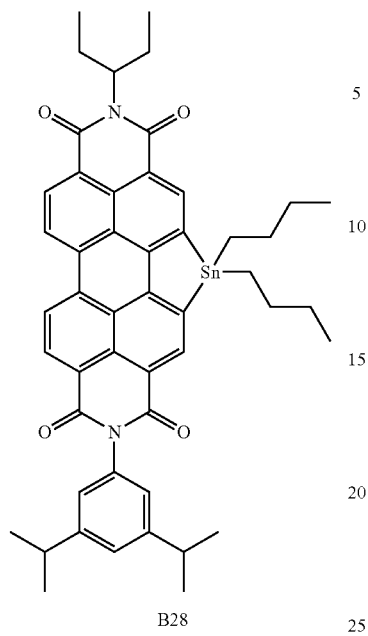

B28

1 g of bromo perylene diimide, 0.4 g of hexa-n-butyl ditin, 13 mg of dibenzylidene acetone palladium dichloride, and 17 mg of trismethylphenylphosphine were collected and placed into a reaction flask, 5 mL of o-xylene was added, and a resulting mixture was stirred and refluxed at 110° C. for 3 hrs. When the reaction was completed, the reaction solution was spin-dried under a reduced pressure, and 0.43 g of a product was obtained by column chromatography. The yield was 35%. HRMS (MALDI-TOF): found 852.2949.

Example 29

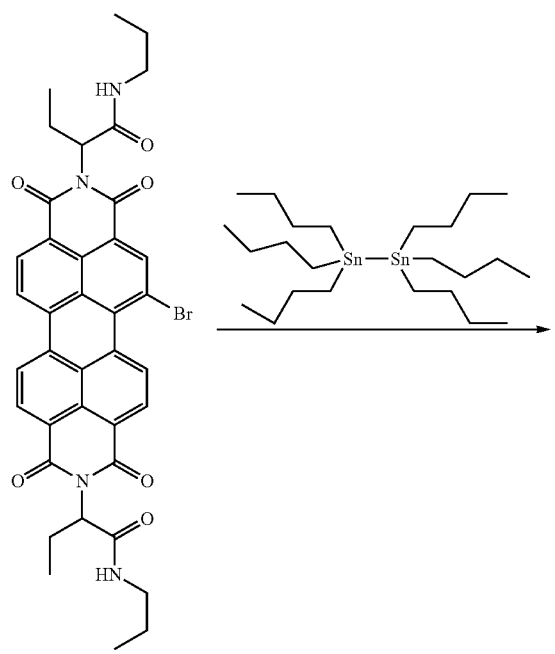

34
-continued

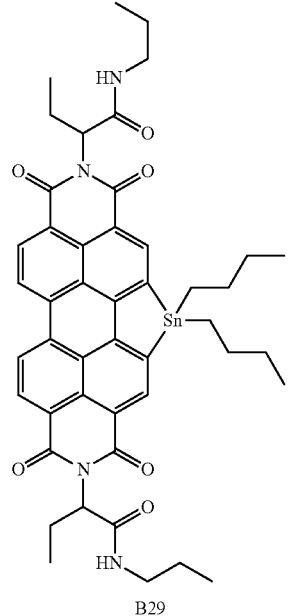

B29

1 g of bromo perylene diimide, 7.86 g of hexa-n-butyl ditin, 12 mg of dibenzylidene acetone palladium dichloride, and 16 mg of trismethylphenylphosphine were collected and placed into a reaction flask, 5 mL of o-xylene was added, and a resulting mixture was stirred and refluxed at 110° C. for 3 hrs. After the reaction was completed, the reaction solution was spin-dried under a reduced pressure, and 0.43 g of a product was obtained by column chromatography. The yield was 35.6%. HRMS (MALDI-TOF): found 890.3065.

Example 30

The 6-undecylamine derived tin cyclized perylene diimide obtained from Example 2 was studied on its properties.

(1) The UV-Vis spectra of 6-undecylamine derived tin cyclized perylene diimide and 6-undecylamine derived perylene diimide (shown in FIG. 1) were tested, and from the comparison, it was found that the absorption spectrum of 6-undecylamine derived tin cyclized perylene diimide has obvious red shift.

Figure 2:
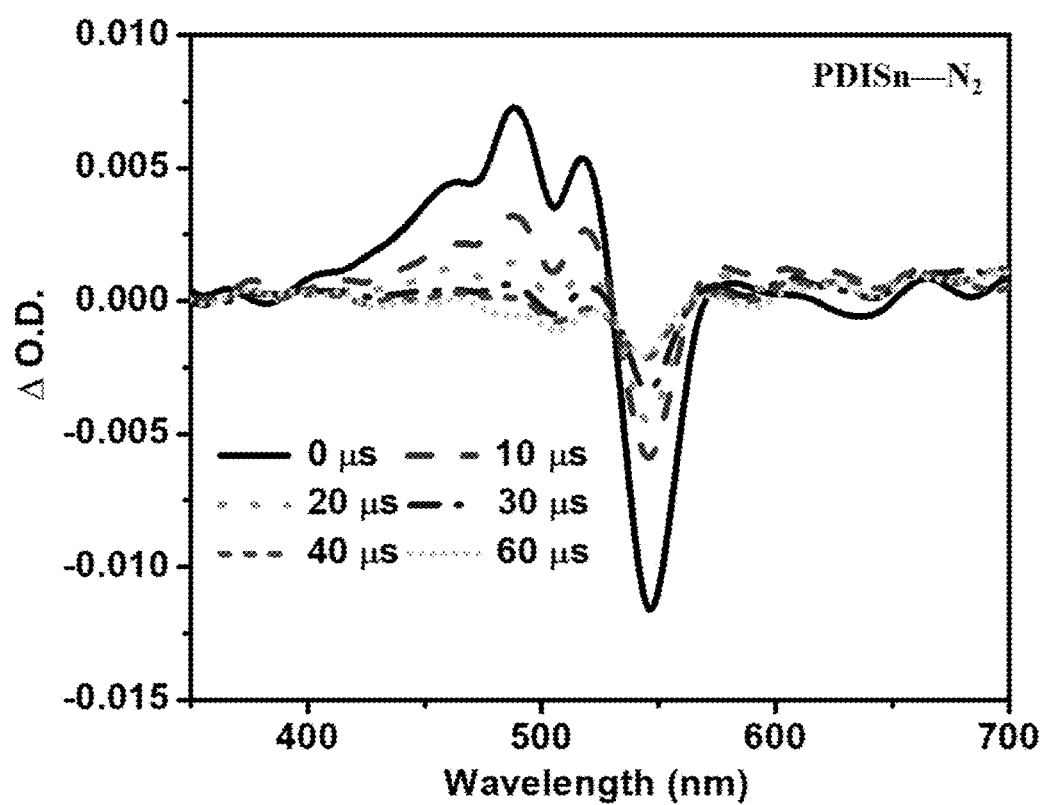
FIG. 2 is a transient absorption spectrum of 6-undecylamine derived tin cyclized perylene diimide.

(2) The transient absorption spectrum of 6-undecylamine derived tin cyclized perylene diimide (shown in FIG. 2) was tested, and a strong excited triplet absorption at 400 nm-515 nm was detected.

Figure 3:
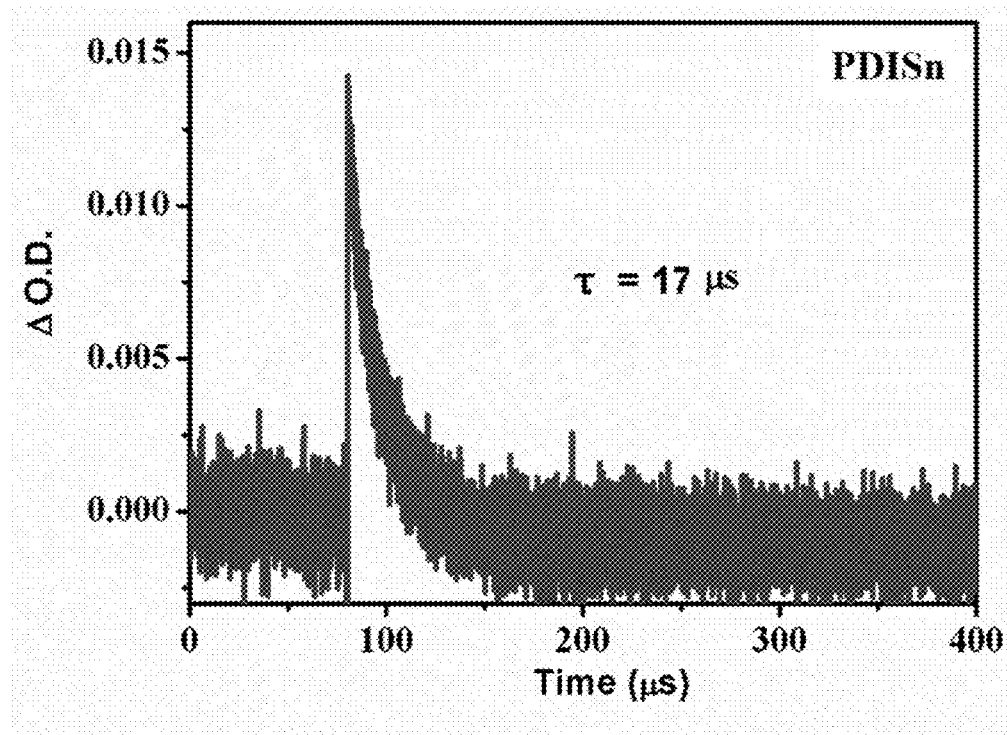
FIG. 3 is a triplet decay curve of 6-undecylamine derived tin cyclized perylene diimide.

(3) FIG. 3 shows the dynamic absorption fitting triplet decay time at 485 nm in the transient absorption spectrum of 6-undecylamine derived tin cyclized perylene diimide. The decay time is 17 μs. 6-undecylamine derived tin cyclized perylene diimide has a relatively long triplet time life.

Figure 4:
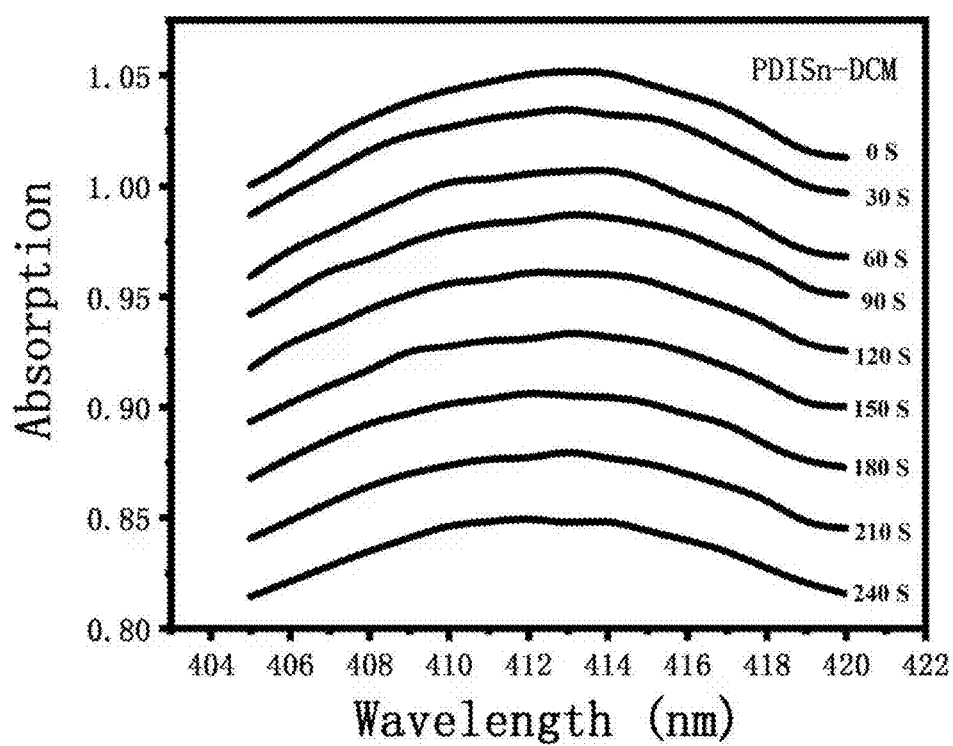
FIG. 4 is a graph showing decay of a UV-visible absorption of DPBF in DCM with time under the influence of 6-undecylamine derived tin cyclized perylene diimide as a photosensitizer.

(4) The triplet energy of the photosensitizer can be transferred to triplet oxygen molecules ($^3O_2$), to produce singlet oxygen molecules ($^1O_2$). 1,3-diphenylisobenzofuran (DPBF) is used to capture singlet oxygen, and at the same time, DPBF itself is oxidized by $^1O_2$, resulting in a decrease in the absorption peak of DPBF at 414 nm in the UV-visible absorption spectrum. The singlet oxygen quantum yield of the photosensitizer molecule can be calculated by monitoring the absorbance change of DPBF at 414 nm. FIG. 4 is a graph showing decay of a UV-visible absorption of DPBF in DCM with time under the influence of 6-undecylamine derived tin cyclized perylene diimide as a photosensitizer. It is known from calculation that the singlet oxygen quantum yield of 6-undecylamine derived tin cyclized perylene diimide is 40%.

Figure 5:
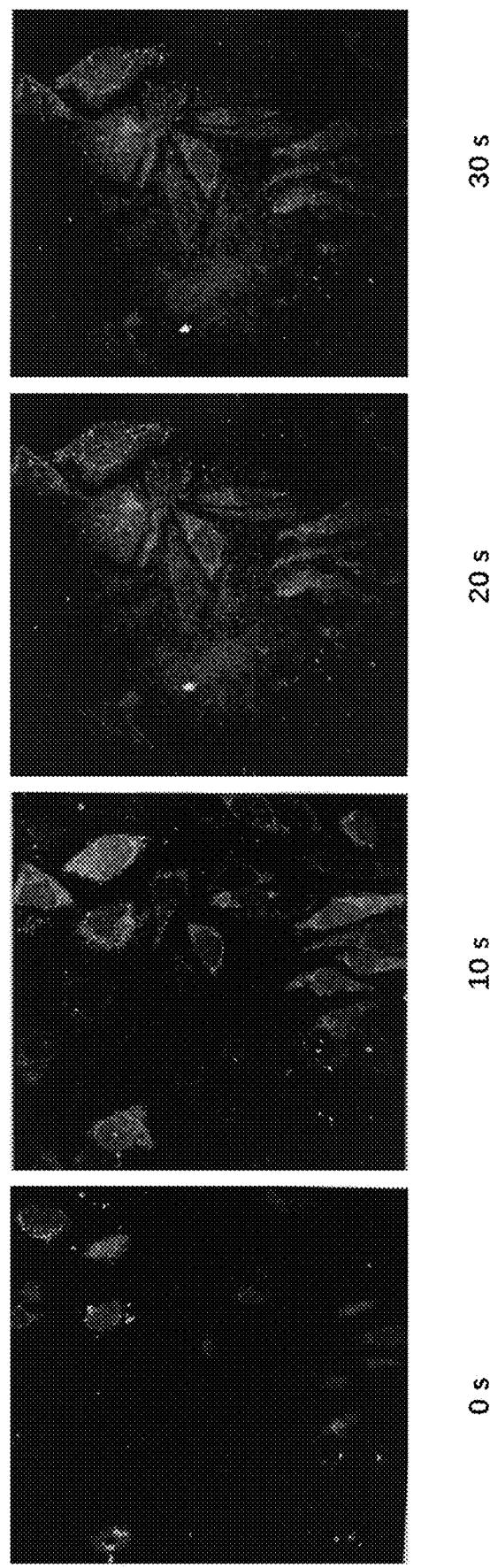
FIG. 5 shows images of DCFH-DA in cervical cancer cells under the influence of 6-undecylamine derived tin cyclized perylene diimide as a photosensitizer.

(5) The application of photosensitizers to photodynamic therapy requires the photosensitizers to have low cytotoxicity and capability of entering cells, and to achieve better singlet oxygen output in the cells. In cervical cancer cells, the fluorescent probe DCFH-DA, as a reactive oxygen detection reagent, is non-fluorescent and can freely penetrate the cell membrane to enter the cell. The reactive oxygen species (single oxygen) in the cells can oxidize the non-fluorescent DCFH to produce a fluorescent DCF, and the level of the reactive oxygen species can be known by detecting the fluorescence intensity of DCF. FIG. 5 shows images of DCFH-DA in cervical cancer cells under the influence of 6-undecylamine derived tin cyclized perylene diimide as a photosensitizer. In the figure, fluorescence images of the cervical cancer cells, which are cultured in the presence of 6-undecylamine derived tin cyclized perylene diimide and DCFH-DA, subjected to no light, and 10 s, 20 s, 30 s of 420 nm green light irradiation are respectively presented from left to right. It is known from the figure that the singlet oxygen generated from photosensitization of 6-undecylamine derived tin cyclized perylene diimide oxidizes DCFH to produce fluorescent DCF, which makes the fluorescence of cervical cancer cells appear by imaging, and the imaging effect becomes better along with the time. The fluorescence intensity of cervical cancer cells no longer changes after 20 s, which indicates that 6-undecylamine derived tin cyclized perylene diimide has a good singlet oxygen effect in cells.

Example 31

Properties of compounds B4, B6, B10, B14, B16, B17, B20, B22, B25, and B27 are listed in the following table. The test conditions and methods are the same as those in Example 30.

| Compounds | Absorption spectrum | Triplet decay time | Singlet oxygen quantum yield |
| --- | --- | --- | --- |
| B4 | red shift | 17 μs | 47% |
| B6 | red shift | 18 μs | 29% |
| B10 | red shift | 12 μs | 26% |
| B14 | red shift | 14 μs | 33% |
| B16 | red shift | 19 μs | 46% |
| B17 | red shift | 11 μs | 36% |
| B20 | red shift | 25 μs | 42% |
| B22 | red shift | 21 μs | 44% |
| B25 | red shift | 22 μs | 39% |
| B27 | red shift | 18 μs | 32% |

List of properties of compounds B4, B6, B10, B14, B16, B17, B20, B22, B25, and B27

Unless otherwise indicated, the numerical ranges involved in the present application include the end values. While particular embodiments of the present application have been shown and described, it will be obvious to those skilled in the art that changes and modifications may be made without departing from the present application in its broader aspects, and therefore, the aim in the appended claims is to cover all such changes and modifications as fall within the true spirit and scope of the present application.

What is claimed is:
1. A metal tin cyclized perylene diimide derivative, having a structure formula of:

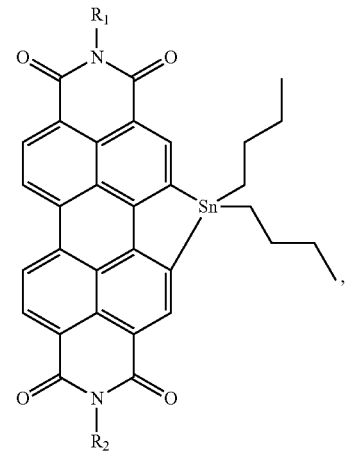

wherein
$R_1$ and $R_2$ are each independently selected from a hydrogen atom or a group containing or not containing a substituent, wherein the group containing or not containing a substituent is an alkyl having between 1 and 60 carbon atoms, an alkoxy having between 1 and 60 carbon atoms, a cycloalkyl having between 3 and 60 carbon atoms, an aryl having between 5 and 60 atoms, an alkylaryl having between 1 and 60 carbon atoms, an alkylheteroaryl having between 1 and 60 carbon atoms, an alkylheterocyclyl having between 1 and 60 carbon atoms, an alkyleneoxyalkyl having between 1 and 60 carbon atoms, an alkyleneoxyaryl having between 1 and 60 carbon atoms, an alkyleneoxyheteroaryl having between 1 and 60 carbon atoms, or an alkyleneoxyheterocyclyl having between 1 and 60 carbon atoms.

2. The metal tin cyclized perylene diimide derivative according to claim 1, wherein
the group containing or not containing a substituent is methyl, ethyl, propyl, isopropyl, n-butyl, sec-butyl, isobutyl, tert-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, methoxy, ethoxy, propoxy, isopropoxy, n-butoxy, sec-butoxy, isobutoxy, tert-butoxy, pentoxy, hexyloxy, heptoxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosyloxy, phenyl, naphthyl, anthryl, phenanthryl, tetraphenyl, pentaphenyl, hexaphenyl, pyrenyl, indenyl, biphenyl, fluorenyl, cyclobutyl, cyclopentyl, cyclohexyl, cycloheptyl, cyclooctyl, cyclononyl, cyclodecyl, undecylcycloalkyl, dodecylcycloalkyl, tridecylcycloalkyl, tetradecylcycloalkyl, pentadecylcycloalkyl, hexadecylcycloalkyl, heptadecylcycloalkyl, octadecylcycloalkyl, nonadecylcycloalkyl, eicosylcycloalkyl, thienyl, pyrrolyl, furyl, selenyl, thirolyl, telluryl, oxazolyl, pyridyl, or pyrimidinyl containing or not containing a substituent.

3. The metal tin cyclized perylene diimide derivative according to claim 1,
wherein the substituent is at least one selected from the group consisting of methyl, ethyl, propyl, isopropyl, n-butyl, sec-butyl, isobutyl, tert-butyl, hydroxyl, sulfhydryl, fluorine atom, chlorine atom, bromine atom, iodine atom, cyano, aldehyde, esteryl, sulfonate, sulfinate, nitro, amino, imino, carboxyl, and hydrazine.

4. A method for preparing the metal tin cyclized perylene diimide derivative according to claim 1, the method comprising:

mixing a compound A and hexa-n-butyl ditin, adding a catalyst and an organic solvent, stirring while heating a resulting mixture to carry out reaction, whereby yielding the metal tin cyclized perylene diimide derivative,

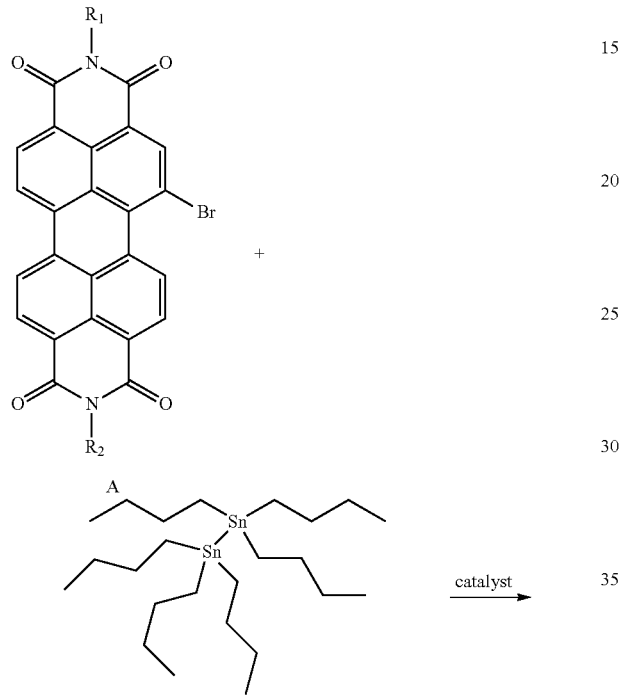

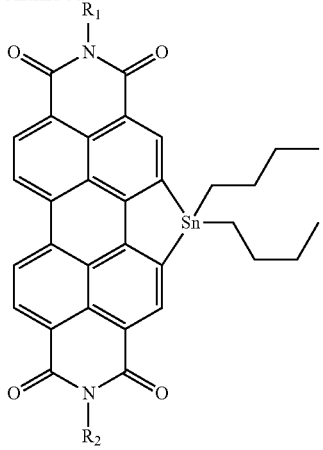

wherein $R_1$ and $R_2$ are the same as defined in claim 1.

5. The method according to claim 4, wherein the heating temperature is between 90 and 180° C., a reaction time is between 1 and 30 hrs, and a dosage of hexa-n-butyl ditin is between 0.5 and 10 folds of a dosage of the compound A;

the organic solvent is one or more selected from the group consisting of benzene, toluene, xylene, chlorobenzene, dichlorobenzene, tetrahydrofuran, dioxane, nitrogen methyl pyrrolidone, dimethyl formamide, dimethyl acetamide, dimethyl sulfoxide, hexamethyl phosphoramide, sulfolane, acetonitrile, and benzonitrile; and the catalyst is palladium acetate or tris(dibenzylideneacetone)dipalladium.

* * * * *